United States Patent
Yu et al.

(10) Patent No.: US 11,942,643 B2
(45) Date of Patent: Mar. 26, 2024

(54) DOPED SODIUM VANADIUM PHOSPHATE AND PREPARATION METHOD AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yingsheng Zhong, Guangdong (CN); Aixia Li, Guangdong (CN); Yinghao Xie, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/265,847

(22) PCT Filed: Aug. 12, 2022

(86) PCT No.: PCT/CN2022/112241
§ 371 (c)(1),
(2) Date: Jun. 7, 2023

(87) PCT Pub. No.: WO2023/071411
PCT Pub. Date: May 4, 2023

(65) Prior Publication Data
US 2024/0038993 A1    Feb. 1, 2024

(30) Foreign Application Priority Data

Oct. 29, 2021    (CN) .......................... 202111272724.8

(51) Int. Cl.
*H01M 4/62*    (2006.01)
*C01B 25/45*    (2006.01)
(Continued)

(52) U.S. Cl.
CPC .............. *H01M 4/62* (2013.01); *C01B 25/45* (2013.01); *C01G 39/02* (2013.01);
(Continued)

(58) Field of Classification Search
CPC .... H01M 4/62; H01M 4/5825; H01M 10/054; H01M 2004/028; C01B 25/45;
(Continued)

(56) References Cited

U.S. PATENT DOCUMENTS

2018/0290891 A1    10/2018    Gong et al.

FOREIGN PATENT DOCUMENTS

| CN | 108539191 A | 9/2018 |
| CN | 109244382 A | 1/2019 |

(Continued)

OTHER PUBLICATIONS

International Search Report and Written Opinion of the International Searching Authority issued by the China National Intellectual Property Administration for International Patent Application No. PCT/CN2022/112241, dated Oct. 28, 2022, with an English translation.

(Continued)

*Primary Examiner* — Jane J Rhee
(74) *Attorney, Agent, or Firm* — MYERS WOLIN, LLC

(57) ABSTRACT

A doped sodium vanadium phosphate and a preparation method and application thereof. Preparation steps of a (Continued)

nitrogen-doped peony-shaped molybdenum oxide in raw materials of the doped sodium vanadium phosphate are as follows: adding a regulator into a molybdenum-containing solution for reaction, concentrating and thermal treatment to obtain a peony-shaped molybdenum oxide; and dissolving the peony-shaped molybdenum oxide in a conditioning agent, and adding an amine source for standing, centrifuging, washing and heat treatment, thus obtaining the nitrogen-doped peony-shaped molybdenum oxide.

17 Claims, 3 Drawing Sheets

(51) Int. Cl.
*C01G 39/02* (2006.01)
*H01M 4/58* (2010.01)
*H01M 10/054* (2010.01)
*H01M 4/02* (2006.01)

(52) U.S. Cl.
CPC ....... *H01M 4/5825* (2013.01); *H01M 10/054* (2013.01); *C01P 2004/03* (2013.01); *C01P 2004/80* (2013.01); *C01P 2006/12* (2013.01); *C01P 2006/40* (2013.01); *H01M 2004/028* (2013.01)

(58) Field of Classification Search
CPC .. C01G 39/02; C01P 2004/03; C01P 2004/80; C01P 2006/12; C01P 2006/40
See application file for complete search history.

(56) References Cited

FOREIGN PATENT DOCUMENTS

| | | |
|---|---|---|
| CN | 111710867 A | 9/2020 |
| CN | 113198455 A | 8/2021 |
| CN | 114195193 A | 3/2022 |
| CN | 114195193 B | 6/2023 |

OTHER PUBLICATIONS

First Search Report issued by the State Intellectual Property Office of People's Republic of China for Chinese Patent Application No. 202111272724.8, dated Oct. 25, 2022, with an English translation.
Gong et al., "Hydrothermal synthesis of controlled morphologies of MoO3 nanobelts and hierarchical structures", Materials Letters, Apr. 2015, vol. 154, ISSN: 0167-577X, http://dx.doi.org/10.1016/j.matlet.2015.04.092.
Chithambararaj et al., "Role of synthesis variables on controlled nucleation and growth of hexagonal molybdenum oxide nanocrystals", CrystEngComm, The Royal Society of Chemistry, Mar. 2014, vol. 16, ISSN: 1466-8033.
First Office Action issued by the State Intellectual Property Office of People's Republic of China for Chinese Patent Application No. 202111272724.8, dated Oct. 31, 2022, with an English translation.
Notification to Grant Patent Right issued by the State Intellectual Property Office of People's Republic of China for Chinese Patent Application No. 202111272724.8, dated Mar. 30, 2023, with an English translation.

DOPED SODIUM VANADIUM PHOSPHATE AND PREPARATION METHOD AND APPLICATION THEREOF

CROSS-REFERENCE TO RELATED APPLICATION

This application is a national stage filing under 35 U.S.C. § 371 of international application number PCT/CN2022/112241, filed Aug. 12, 2022, which claims priority to Chinese patent application No. 202111272724.8 filed Oct. 29, 2021. The contents of these applications are incorporated herein by reference in their entirety.

TECHNICAL FIELD

The present disclosure belongs to the technical field of sodium ion batteries, and particularly relates to a doped sodium vanadium phosphate, and a preparation method and application thereof.

BACKGROUND

Because there is a large amount of sodium in the earth's crust, sodium ion batteries (NIBs) are considered as the most potential secondary batteries to replace lithium ion batteries (LIBs). In recent years, people have made great efforts to develop the key technologies of NIBs, such as negative materials, positive materials and electrolytes. However, the positive materials of NIBs have inevitable disadvantages, such as larger atomic weight than that of sodium and lower standard electrochemical potential, and play the most important role in determining the energy density of sodium. Up to now, various positive materials for sodium ion batteries have been discovered and developed, including stratified transition metal oxides, tunnel transition metal oxides, polyanion compounds, mixed polyanion compounds, Prussian blue compounds, amorphous compounds, and the like. The polyanion and mixed polyanion positive materials for sodium ion batteries have good cycle stability due to little structural change, good performance and high output voltage thereof. However, due to the characteristics of the polyanion groups, the tap density of the polyanion compounds is lower, the weight capacity density and volume energy density of the sodium ion batteries are relatively low, and the rate performance is poor, which greatly limits the development and application of the sodium ion batteries. Therefore, to develop novel polyanion sodium an ion positive material with better performances is still the focus of current research.

SUMMARY

The present disclosure aims at solving at least one of the above-mentioned technical problems in the existing technology. Therefore, the present disclosure provides a doped sodium vanadium phosphate and a preparation method and application thereof. The sodium vanadium phosphate has rich sodium ion binding sites and stable structure, which can expand a contact range between the sodium vanadium phosphate and an electrolyte, correspondingly increase sodium storage sites of the synthesized sodium vanadium phosphate, simultaneously shorten a diffusion path of sodium ions, and improve a deintercalation rate of the sodium ions during charging and discharging.

In order to achieve the above object, the present disclosure adopts the following technical solutions.

A preparation method of a nitrogen-doped peony-shaped molybdenum oxide includes the following steps of:
(1) adding a regulator into a molybdenum-containing solution for reaction, concentrating and thermal treatment to obtain a peony-shaped molybdenum oxide; and
(2) dissolving the peony-shaped molybdenum oxide in a conditioning agent, and adding an amine source for standing, centrifuging, washing and heat treatment, thus obtaining the nitrogen-doped peony-shaped molybdenum oxide; wherein, the regulator is at least one of nitric acid, ammonium nitrate, sodium persulfate, ammonium persulfate, nitric acid, concentrated sulfuric acid, $H_2O_2$, ozone or sodium hypochlorite.

Preferably, in step (1), the molybdenum-containing solution is obtained by dissolving a molybdenum source in a solvent.

Further preferably, the molybdenum source is at least one of sodium molybdate, molybdenum acetate, molybdenum formate, molybdenum citrate, ammonium molybdate, molybdenum oxide and molybdenum powder.

Further preferably, the solvent is at least one of methanol, ethanol, n-propanol n-propanol, isopropanol, ethylene glycol, propylene glycol, propanetriol, acetone, ethyl ketone, butanone, diethyl ketone, dimethyl ether, ethyl ether or diethyl ether.

Further preferably, in step (1), a solid-liquid ratio of the molybdenum source to the solvent is (0.5 to 20):(10 to 40) g/mL; and preferably (0.5 to 2):(10 to 15) g/mL.

Further, the regulator is at least one of $H_2O_2$ and nitric acid.

Preferably, in step (1), a concentration of the regulator ranges from 5 wt % to 45 wt % and preferably 25 wt % to 35 wt %.

Preferably, in step (1), an addition amount of the regulator is 0.01 v/v % to 25 v/v % of the molybdenum-containing solution and preferably 0.01 v/v % to 15 v/v % of the molybdenum-containing solution.

Preferably, in step (1), the reaction is performed at a temperature of 200° C. to 900° C., and lasts for 8 hours to 36 hours.

Preferably, in step (1), the concentrating refers to evaporating and dehydrating the solution after the reaction.

Preferably, in step (1), the thermal treatment is performed at a temperature of 400° C. to 600° C., and lasts for 3 hours to 8 hours.

Preferably, in step (1), after the thermal treatment, the method further includes the steps of cooling, washing and drying the product after the thermal treatment.

Preferably, in step (2), the conditioning agent is at least one of sodium acetate, ammonium acetate, sodium formate, diaminoethane, sodium oxalate, sodium acetate, ammonium acetate, ammonium benzoate, sodium phenylacetate, sodium propionate, sodium tartrate, sodium citrate or ammonium citrate.

Preferably, in step (2), the amine source is at least one of aniline, dimethylamine, trimethylamine, benzylamine, phenethylamine, ethamine, diethylamine, propylamine, phenylene diamine, benzylamine, benzene dimethylamine or benzedrinum.

Preferably, in step (2), a concentration of a regulating substance in the regulator ranges from 0.001 mol/L to 2.0 mol/L.

Preferably, in step (2), a solid-liquid ratio of the peony-shaped molybdenum oxide to the conditioning agent and the amine source is (0.1 to 10):(50 to 200):(0.01 to 5) g/mL/g.

Preferably, in step (2), an atmosphere of the thermal treatment is one of Ne, Ar, Kr and Xe.

Preferably, in step (2), the thermal treatment is performed at a temperature of 300° C. to 700° C., and lasts for 8 hours to 72 hours. Preferably, the thermal treatment is performed at a temperature of 300° C. to 500° C. and lasts for 24 hours to 36 hours.

A nitrogen-doped peony-shaped molybdenum oxide prepared by the preparation method above, wherein a chemical formula of the nitrogen-doped peony-shaped molybdenum oxide is N—$MoO_3$.

A preparation method of a doped sodium vanadium phosphate includes the following steps of:
(1) mixing a vanadium source, a sodium source, a phosphorus source and the nitrogen-doped peony-shaped molybdenum oxide for ball-milling, washing and concentrating to obtain a precursor; and
(2) calcining the precursor to obtain the doped sodium vanadium phosphate $Na_3V_2(PO_4)_3 \cdot mN\text{-}MoO_3$.

Preferably, in step (1), the vanadium source is at least one of metavanadic acid, sodium metavanadate, ammonium metavanadate, sodium orthovanadate or ammonium orthovanadate.

Preferably, in step (1), the sodium source is at least one of sodium hydroxide, sodium carbonate, sodium hydrogen phosphate, sodium dihydrogenphosphate, sodium oxalate, sodium formate, sodium citrate, sodium methanesulfonate or sodium acetate.

Further preferably, in step (1), the sodium source is at least one of sodium hydroxide and sodium formate.

Preferably, in step (1), the phosphorus source is at least one of sodium phosphate, sodium hydrogen phosphate, ferrous phosphate, phosphoric acid, ammonium dihydrogen phosphate and diammonium phosphate.

Further preferably, in step (1), the phosphorus source is at least one of ammonium dihydrogen phosphate and phosphoric acid.

Preferably, in step (1), the mixing further includes the step of adding a dispersing agent for mixing.

Further preferably, the dispersing agent is at least one of triethanolamine, propanetriol, methanol, ethanol and polyalcohol amine.

Preferably, in step (1), a molar ratio of the sodium source to the vanadium source and the phosphorus source is (0.01 to 60):(0.01 to 40):(0.01 to 60).

Preferably, in step (1), an addition amount of the nitrogen-doped peony-shaped molybdenum oxide is 0.01% to 10% of a total mass of the sodium source, the vanadium source and the phosphorus source.

Preferably, in step (1), a discharge particle size of the ball-milling is less than 50 m, and preferably less than 10 m.

Preferably, in step (1), the ball-milling is performed at a rotating speed ranging from 100 r/min to 2,000 r/min, and lasts for 4 hours to 48 hours; and the rotating speed is 600 r/min to 1,000 r/min preferably.

Preferably, in step (1), the calcining is performed at a temperature of 300° C. to 1,000° C., and lasts for 3 hours to 24 hours; and the calcining is preferably performed at a temperature of 400° C. to 600° C., and lasts for 4 hours to 10 hours.

Preferably, an atmosphere of the calcining is inert gas; and the inert gas is Ne, Ar, Kr and Xe.

A doped sodium vanadium phosphate prepared by the preparation method above, wherein a chemical formula of the doped sodium vanadium phosphate is $Na_3V_2(PO_4)_3 \cdot mN\text{-}MoO_3$, and $0.0001 \leq m \leq 0.1$.

A battery includes the doped sodium vanadium phosphate.

Compared with the existing technology, the present disclosure has the following beneficial effects.

1. The nitrogen-doped peony-shaped molybdenum oxide of the present disclosure is prepared by adding the regulator. The peony-shaped three-dimensional molybdenum oxide can increase a specific surface area of a positive material and chemical reaction sites of an electrochemical reaction, thus effectively improving a reversible capacity of the electrode material. Therefore, the nitrogen-doped peony-shaped molybdenum oxide is doped in the sodium vanadium phosphate, so that the sodium vanadium phosphate has rich sodium ion binding sites and stable structure, which can expand a contact range between the sodium vanadium phosphate and the electrolyte, correspondingly increase sodium storage sites of the synthesized sodium vanadium phosphate, simultaneously shorten a diffusion path of sodium ions, and improve a deintercalation rate of the sodium ions during charging and discharging.

2. By doping the nitrogen-doped peony-shaped molybdenum oxide into the sodium vanadate phosphate, firstly, the present disclosure can slow down crystal distortion of the sodium vanadate phosphate, improve the structural stability, and facilitate the stability of the material under the conditions of long-cycle and high-voltage discharging. Secondly, through modification, a surface loss of sodium ion deintercalation during charging and discharging can be reduced, and a cyclic stability of the surface of the sodium vanadate phosphate material can be improved, thus improving a resistance to the surface reduced sodium vanadate phosphate during charging and discharging and enhancing electrochemical performances of the sodium vanadate phosphate.

DETAILED DESCRIPTION

Figure 1:
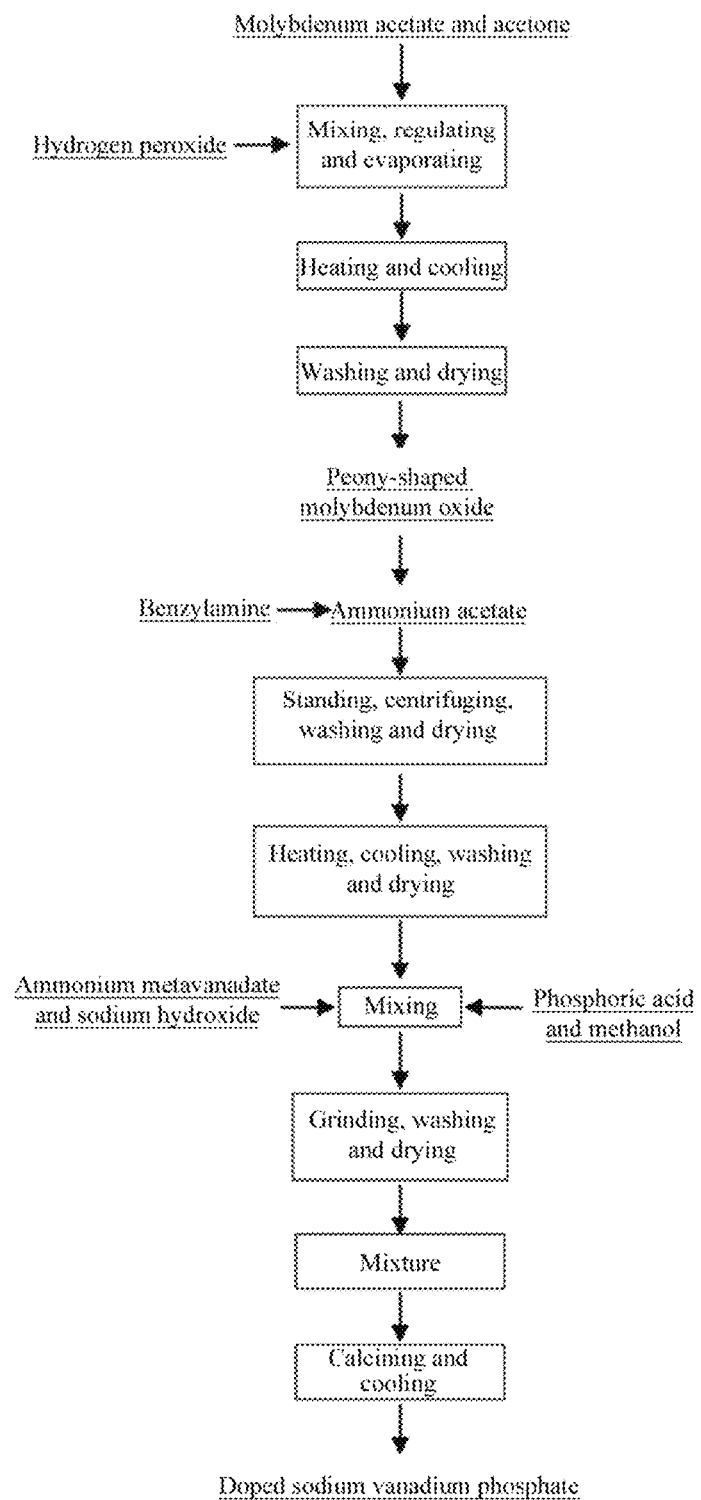
FIG. 1 is a process flowchart of Embodiment 1 of the present disclosure.

The concepts and the technical effects produced of the present disclosure will be clearly and completely described in conjunction with the embodiments so as to sufficiently understand the objects, the features and the effects of the present disclosure. Obviously, the described embodiments are merely some embodiments of the disclosure, rather than all the embodiments. Other embodiments obtained by those skilled in the art without going through any creative effort shall all fall within the protection scope of the disclosure.

Embodiment 1

A preparation method of a doped sodium vanadium phosphate of this embodiment included the following steps of:
(1) peony-shaped three-dimensional molybdenum oxide: dissolving 60 g of molybdenum acetate in 400 mL of acetone, adding 25 mL of $H_2O_2$ with a mass fraction of 28% for reaction, removing gases in the reaction, evaporating and dehydrating the reacted solution, then heating the solution at 460° C. for 6 hours, cooling, washing and drying to obtain 21 g of peony-shaped molybdenum oxide;

(2) nitrogen-doped peony-shaped molybdenum oxide (nitrogen-doped peony-shaped three-dimensional molybdenum oxide): adding 8.3 g of peony-shaped molybdenum oxide to 100 mL of 0.012 mol/L ammonium acetate solution (a pH of ammonium acetate=7.8), adding 1.5 mL of benzylamine, then standing, centrifuging, washing and drying the mixture, sending the mixture to an Ar atmosphere heating furnace for high-temperature treatment at 440° C. for 10 hours, and then cooling, washing and drying to obtain 8.4 g of nitrogen-doped peony-shaped molybdenum oxide;

(3) synthesis: mixing 23.5 g of ammonium metavanadate, 12 g of sodium hydroxide, 300 mL of 11.5 wt % phosphoric acid and 20 mL of methanol, and then adding 1.2 g of nitrogen-doped peony-shaped molybdenum oxide (an addition amount of the nitrogen-doped peony-shaped molybdenum oxide was 1.7% of a total mass of the ammonium metavanadate, the sodium hydroxide and the phosphoric acid) to obtain a mixture, ball-milling the mixture at 840 r/min in Ar atmosphere (a discharge particle size was less than 50 m) for 8 hours, washing and drying the mixture to remove methanol, and then evaporating and drying the mixture to obtain a $Na_3V_2(PO_4)_3$ precursor; and (4) sending the precursor into a heating furnace, introducing Ar, calcining at 550° C. for 8 hours, and then cooling to obtain the doped sodium vanadate phosphate $Na_3V_2(PO_4)_3 \cdot 0.017N-MoO_3$.

Embodiment 2

A preparation method of a doped sodium vanadium phosphate of this embodiment included the following steps of:

(1) peony-shaped three-dimensional molybdenum oxide: dissolving 60 g of molybdenum acetate in 400 mL of acetone, adding 25 mL of $H_2O_2$ with a mass fraction of 28% for reaction, removing gases in the reaction, evaporating and dehydrating the reacted solution, then heating the solution at 460° C. for 6 hours, cooling, washing and drying to obtain 21 g of peony-shaped molybdenum oxide;

(2) nitrogen-doped peony-shaped molybdenum oxide (nitrogen-doped peony-shaped three-dimensional molybdenum oxide): adding 10 g of peony-shaped molybdenum oxide to 120 mL of 0.012 mol/L ammonium acetate solution (a pH of ammonium acetate=7.8), adding 1.5 mL of benzylamine, then standing, centrifuging, washing and drying the mixture, sending the mixture to an Ar atmosphere heating furnace for high-temperature treatment at 485° C. for 10 hours, and then cooling, washing and drying to obtain 10.3 g of nitrogen-doped peony-shaped molybdenum oxide;

(3) synthesis: mixing 23.5 g of ammonium metavanadate, 12 g of sodium hydroxide, 300 mL of 11.5 wt % phosphoric acid and 25 mL of methanol, and then adding 1.8 g of nitrogen-doped peony-shaped molybdenum oxide (an addition amount of the nitrogen-doped peony-shaped molybdenum oxide was 2.6% of a total mass of the ammonium metavanadate, the sodium hydroxide and the phosphoric acid) to obtain a mixture, ball-milling the mixture at 900 r/min in Ar atmosphere for 8 hours (a discharge particle size was less than 50 m), washing and drying the mixture to remove methanol, and then evaporating and drying the mixture to obtain a $Na_3V_2(PO_4)_3$ precursor; and (4) sending the precursor into a heating furnace, introducing Ar, calcining at 550° C. for 8 hours, and then cooling to obtain the doped sodium vanadate phosphate $Na_3V_2(PO_4)_3 \cdot 0.026N-MoO_3$.

Embodiment 3

A preparation method of a doped sodium vanadium phosphate of this embodiment included the following steps of:

(1) peony-shaped three-dimensional molybdenum oxide: dissolving 25 g of molybdenum acetate in 240 mL of propanetriol, adding 18 mL of $H_2O_2$ with a mass fraction of 28% for reaction, removing gases in the reaction, evaporating and dehydrating the reacted solution, then heating the solution at 530° C. for 8 hours, cooling, washing and drying to obtain 25 g of peony-shaped molybdenum oxide;

(2) nitrogen-doped peony-shaped molybdenum oxide (nitrogen-doped peony-shaped three-dimensional molybdenum oxide): adding 10 g of peony-shaped molybdenum oxide to 100 mL of 0.034 mol/L sodium citrate solution (a pH of the sodium citrate solution was regulated to be 8.1), adding 1.5 mL of benzylamine, then standing, centrifuging, washing and drying the mixture, sending the mixture to an Ar atmosphere heating furnace for high-temperature treatment at 440° C. for 10 hours, and then cooling, washing and drying to obtain 10.3 g of nitrogen-doped peony-shaped molybdenum oxide;

(3) synthesis: mixing 23.5 g of ammonium metavanadate, 20.4 g of sodium formate, 35 g of ammonium dihydrogen phosphate and 20 mL of triethanolamine, and then adding 1.7 g of nitrogen-doped peony-shaped molybdenum oxide (an addition amount of the nitrogen-doped peony-shaped molybdenum oxide was 2.2% of a total mass of the ammonium metavanadate, the sodium formate and the ammonium dihydrogen phosphate) to obtain a mixture, ball-milling the mixture at 840 r/min in Ar atmosphere for 10 hours (a discharge particle size was less than 50 m), washing and drying the mixture to remove triethanolamine, and then evaporating and drying the mixture to obtain a $Na_3V_2(PO_4)_3$ precursor; and (4) sending the precursor into a heating furnace, introducing Ar, calcining at 660° C. for 8 hours, and then cooling to obtain the doped sodium vanadate phosphate $Na_3V_2(PO_4)_3 \cdot 0.022N-MoO_3$.

Embodiment 4

A preparation method of a doped sodium vanadium phosphate of this embodiment included the following steps of:

(1) peony-shaped three-dimensional molybdenum oxide: dissolving 25 g of molybdenum acetate in 240 mL of propanetriol, adding 20 mL of $H_2O_2$ with a mass fraction of 28% for reaction, removing gases in the reaction, evaporating and dehydrating the reacted solution, then heating the solution at 530° C. for 8 hours, cooling, washing and drying to obtain 25 g of peony-shaped molybdenum oxide;

(2) nitrogen-doped peony-shaped molybdenum oxide (nitrogen-doped peony-shaped three-dimensional molybdenum oxide): adding 8.3 g of peony-shaped molybdenum oxide to 100 mL of 0.034 mol/L sodium citrate solution (a pH of the sodium citrate solution was regulated to be 8.1), adding 1.5 mL of benzylamine, then standing, centrifuging, washing and drying the mixture, sending the mixture to an Ar atmosphere heating furnace for high-temperature treatment at 440° C. for 10 hours, and then cooling, washing and drying to obtain 8.8 g of nitrogen-doped peony-shaped molybdenum oxide;

(3) synthesis: mixing 35 g of ammonium metavanadate, 20.4 g of sodium formate, 35 g of ammonium dihydrogen phosphate and 25 mL of triethanolamine, and then adding 2.0 g of nitrogen-doped peony-shaped molybdenum oxide (an addition amount of the nitrogen-doped peony-shaped molybdenum oxide was 2.5% of a total mass of the ammonium metavanadate, the sodium formate and the ammonium dihydrogen phosphate) to obtain a mixture, ball-milling the mixture at 720 r/min in Ar atmosphere for 12 hours (a discharge particle size was less than 50 m), washing and drying the mixture to remove triethanolamine, and then evaporating and drying the mixture to obtain a $Na_3V_2(PO_4)_3$ precursor; and (4) sending the precursor into a heating furnace, introducing Ar, calcining at 660° C. for 8 hours, and then cooling to obtain the doped sodium vanadate phosphate $Na_3V_2(PO_4)_3 \cdot 0.025N-MoO_3$.

Comparative Example 1

A preparation method of a sodium vanadium phosphate of this comparative example included the following steps of:

(1) synthesis: mixing 23.5 g of ammonium metavanadate, 12 g of sodium hydroxide, 300 mL of 11.5 wt % phosphoric acid and 9 mL of methanol, and ball-milling the mixture at 840 r/min in Ar atmosphere for 8 hours (a discharge particle size was less than 50 m), washing and drying the mixture to remove methanol, and then evaporating and drying the mixture to obtain a $Na_3V_2(PO_4)_3$ precursor; and (2) sending the precursor into a heating furnace, introducing Ar, calcining at 550° C. for 8 hours, and then cooling to obtain the sodium vanadate phosphate $Na_3V_2(PO_4)_3$.

Comparative Example 2

A preparation method of a doped sodium vanadium phosphate of this comparative example included the following steps of:

(1) synthesis: mixing 35 g of ammonium metavanadate, 20.4 g of sodium formate, 35 g of ammonium dihydrogen phosphate and 25 mL of triethanolamine, and ball-milling the mixture at 840 r/min in Ar atmosphere for 8 hours (a discharge particle size was less than 50 m), washing and drying the mixture to remove the 25 mL of triethanolamine, and then evaporating and drying the mixture to obtain a $Na_3V_2(PO_4)_3$ precursor; and (2) sending the precursor into a heating furnace, introducing Ar, calcining at 660° C. for 8 hours, and then cooling to obtain the sodium vanadate phosphate $Na_3V_2(PO_4)_3$.

Analysis of Embodiments 1 to 4 and Comparative Examples 1 to 2:

The doped sodium vanadium phosphates or the sodium vanadate phosphates obtained in Embodiments 1 to 4 and Comparative Examples 1 to 2, acetylene black and PVDF were dissolved in deionized water at a mass ratio of 90:5:5 and stirred into slurry, and then the slurry was evenly coated on aluminum foil by a coater, dried and made into positive plates with 1.1 mol/L sodium hexafluorophosphate, DMC/EMC/PC solvents and other additives as electrolytes, and graphite as anodes to prepare coin cells. A BTS battery tester was used to test the cycle performances of the cells, wherein a test voltage ranged from 3.0 V to 4.2 V, a current density was 25 mAh·g$^{-1}$, and a FBT-9A one-point method was used to test BET values.

TABLE 1

Data of Embodiments 1 to 4 and Comparative Examples 1 to 2:

| Sample | Specific capacity (mA · h g$^{-1}$)/cycles | | | | Coulombic efficiency (%)/cycles | | | | BET (m$^2$/g) |
|---|---|---|---|---|---|---|---|---|---|
|  | 1 | 20 | 50 | 100 | 1 | 20 | 50 | 100 |  |
| Embodiment 1 | 138.8 | 134.9 | 117.5 | 104.6 | 91.5 | 88.1 | 83.4 | 77.3 | 1.38 |
| Embodiment 2 | 146.9 | 132.6 | 120.2 | 105.0 | 91.0 | 87.9 | 79.6 | 75.4 | 1.20 |
| Embodiment 3 | 154.3 | 153.6 | 121.3 | 107.8 | 92.8 | 86.5 | 81.3 | 75.9 | 1.65 |
| Embodiment 4 | 151.0 | 146.1 | 122.8 | 108. | 92.3 | 88.3 | 80.4 | 76.1 | 1.31 |
| Comparative Example 1 | 90.3 | 86.8 | 73.5 | 58.6 | 74.5 | 70.7 | 71.9 | 56.3 | 0.77 |
| Comparative Example 2 | 95.6 | 88.3 | 78.2 | 57.5 | 76.2 | 73.8 | 68.4 | 54.4 | 0.92 |

It can be seen from Table 1 that, compared with Comparative Examples 1 to 2, the decrease of the capacity retention rates of Embodiments 1 to 4 at the 1$^{st}$, 20$^{th}$, 50$^{th}$ and hundredth discharge times are not obvious, the Coulomb efficiencies are all high, and the BET values of Embodiments 1 to 4 are 1.38 m$^2$/g, 1.20 m$^2$/g, 1.65 m$^2$/g and 1.31 m$^2$/g respectively. The BET values of Comparative Examples 1-2 are 0.77 and 0.92 respectively, and the BET values of Comparative Examples are lower.

FIG. 1 is a process flowchart of Embodiment 1: adding molybdenum acetate into acetone, adding $H_2O_2$ for reaction, removing gases in the reaction, evaporating and dehydrating the solution after the reaction, then heating, cooling, washing and drying to obtain a peony-shaped molybdenum oxide, adding the peony-shaped molybdenum oxide into an ammonium acetate solution, adding benzylamine for standing, centrifuging, washing and drying, after high-temperature treatment, cooling, washing and drying to obtain a nitrogen-doped peony-shaped molybdenum oxide; mixing ammonium metavanadate, sodium hydroxide, phosphoric acid and methanol, then adding the nitrogen-doped peony-shaped molybdenum oxide for grinding, washing and drying to obtain a mixture, sending the mixture to a heating furnace, calcining and cooling to obtain a doped sodium vanadium phosphate $Na_3V_2(PO_4)_3/N-MoO_3$.

Figure 2:
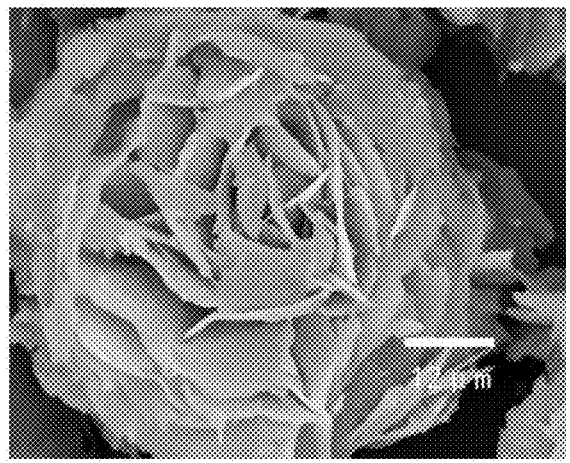
FIG. 2 is an SEM graph of a peony-shaped molybdenum oxide in Embodiment 3.

FIG. 2 is the peony-shaped molybdenum oxide prepared in step (1) of Embodiment 3, with a size of about 48 m.

Figure 3:
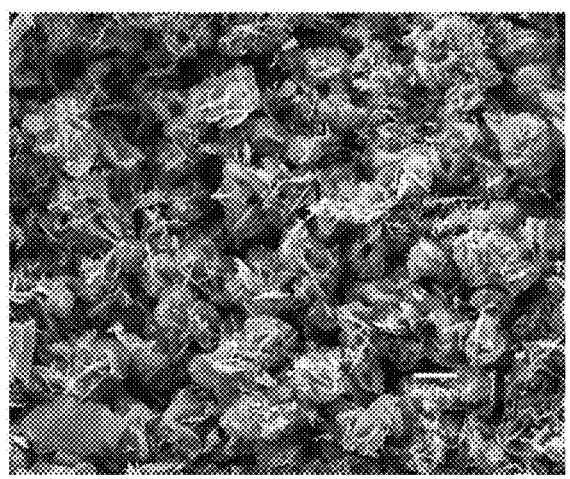
FIG. 3 is an SEM graph of a sodium vanadium phosphate in Embodiment 3.

FIG. 3 is the doped sodium vanadium phosphate $Na_3V_2(PO_4)_3$/N—$MoO_3$ prepared in step (4) of Embodiment 3, and most of the peony-like molybdenum oxides are 40 m to 60 m in size.

Figure 4:
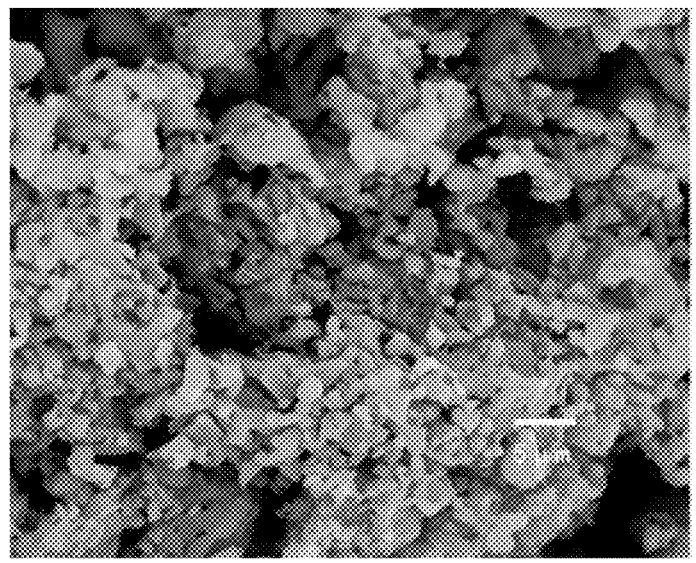
FIG. 4 is an SEM graph of a sodium vanadium phosphate in Comparative Example 1.

FIG. 4 is the granular sodium vanadium phosphate $Na_3V_2(PO_4)_3$ prepared in step (2) of the comparative example, with a size of about 2 m.

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure. In addition, in case of no conflict, the embodiments in the application and the features in the embodiments may be combined with each other.

The invention claimed is:

1. A preparation method of a nitrogen-doped peony-shaped molybdenum oxide, comprising the following steps of:
   (1) adding a regulator into a molybdenum-containing solution for reaction, concentrating and thermal treatment to obtain a peony-shaped molybdenum oxide; and
   (2) dissolving the peony-shaped molybdenum oxide in a conditioning agent, and adding an amine source for standing, centrifuging, washing and heat treatment, thus obtaining the nitrogen-doped peony-shaped molybdenum oxide; wherein, the regulator is at least one of nitric acid, ammonium nitrate, sodium persulfate, ammonium persulfate, concentrated sulfuric acid, $H_2O_2$, ozone or sodium hypochlorite;
   wherein in step (2), the conditioning agent is at least one of sodium acetate, ammonium acetate, sodium formate, diaminoethane, sodium oxalate, ammonium benzoate, sodium phenylacetate, sodium propionate, sodium tartrate, sodium citrate or ammonium citrate; and
   wherein in step (2), the amine source is at least one of aniline, dimethylamine, trimethylamine, benzylamine, phenethylamine, ethamine, diethylamine, propylamine, phenylene diamine, benzylamine, benzene dimethylamine or benzedrinum.

2. The preparation method according to claim 1, wherein in step (1), the molybdenum-containing solution is obtained by dissolving a molybdenum source in a solvent; and the molybdenum source is at least one of sodium molybdate, molybdenum acetate, molybdenum formate, molybdenum citrate, ammonium molybdate, molybdenum oxide or molybdenum powder.

3. The preparation method according to claim 1, wherein in step (2), a solid-liquid ratio of the peony-shaped molybdenum oxide to the conditioning agent and the amine source is (0.1 to 10):(50 to 200):(0.01 to 5) g/mL/g.

4. A nitrogen-doped peony-shaped molybdenum oxide prepared by the preparation method according to claim 1, wherein a chemical formula of the nitrogen-doped peony-shaped molybdenum oxide is N—$MoO_3$.

5. A preparation method of a doped sodium vanadium phosphate, comprising the following steps of:
   (1) mixing a vanadium source, a sodium source, a phosphorus source and the nitrogen-doped peony-shaped molybdenum oxide according to claim 4 for ball-milling, washing and concentrating to obtain a precursor; and
   (2) calcining the precursor to obtain the doped sodium vanadate phosphate $Na_3V_2(PO_4)_3$·N-$MoO_3$.

6. The preparation method according to claim 5, wherein in step (1), the vanadium source is at least one of metavanadic acid, sodium metavanadate, ammonium metavanadate, sodium orthovanadate or ammonium orthovanadate; and the sodium source is at least one of sodium hydroxide, sodium carbonate, sodium hydrogen phosphate, sodium dihydrogenphosphate, sodium oxalate, sodium formate, sodium citrate, sodium methanesulfonate and sodium acetate.

7. The preparation method according to claim 5, wherein in step (1), the phosphorus source is at least one of sodium phosphate, sodium hydrogen phosphate, ferrous phosphate, phosphoric acid, ammonium dihydrogen phosphate and diammonium phosphate; and a molar ratio of the sodium source to the vanadium source and the phosphorus source is (0.01 to 60):(0.01 to 40):(0.01 to 60).

8. A doped sodium vanadium phosphate prepared by the preparation method according to claim 5, wherein a chemical formula of the doped sodium vanadium phosphate is $Na_3V_2(PO_4)_3$·mN-$MoO_3$, and $0.0001 \leq m \leq 0.1$.

9. A battery, comprising the doped sodium vanadium phosphate according to claim 8.

10. A nitrogen-doped peony-shaped molybdenum oxide prepared by the preparation method according to claim 2, wherein a chemical formula of the nitrogen-doped peony-shaped molybdenum oxide is N—$MoO_3$.

11. A nitrogen-doped peony-shaped molybdenum oxide prepared by the preparation method according to claim 3, wherein a chemical formula of the nitrogen-doped peony-shaped molybdenum oxide is N—$MoO_3$.

12. A doped sodium vanadium phosphate prepared by the preparation method according to claim 6, wherein a chemical formula of the doped sodium vanadium phosphate is $Na_3V_2(PO_4)_3$·mN-$MoO_3$, and $0.0001 \leq m \leq 0.1$.

13. A doped sodium vanadium phosphate prepared by the preparation method according to claim 7, wherein a chemical formula of the doped sodium vanadium phosphate is $Na_3V_2(PO_4)_3$·mN-$MoO_3$, and $0.0001 \leq m \leq 0.1$.

14. A preparation method of a doped sodium vanadium phosphate, comprising the following steps of:
   (1) mixing a vanadium source, a sodium source, a phosphorus source and the nitrogen-doped peony-shaped molybdenum oxide according to claim 10 for ball-milling, washing and concentrating to obtain a precursor; and
   (2) calcining the precursor to obtain the doped sodium vanadate phosphate $Na_3V_2(PO_4)_3$·N-$MoO_3$.

15. A preparation method of a doped sodium vanadium phosphate, comprising the following steps of:
   (1) mixing a vanadium source, a sodium source, a phosphorus source and the nitrogen-doped peony-shaped molybdenum oxide according to claim 11 for ball-milling, washing and concentrating to obtain a precursor; and
   (2) calcining the precursor to obtain the doped sodium vanadate phosphate $Na_3V_2(PO_4)_3$·N-$MoO_3$.

16. A battery, comprising the doped sodium vanadium phosphate according to claim 12.

17. A battery, comprising the doped sodium vanadium phosphate according to claim 13.

* * * * *